Feb. 26, 1946. H. BROWNING 2,395,450
TOOL
Filed Dec. 19, 1944
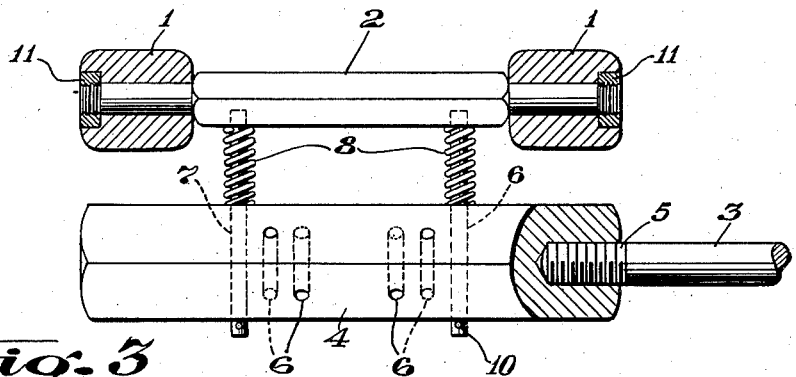
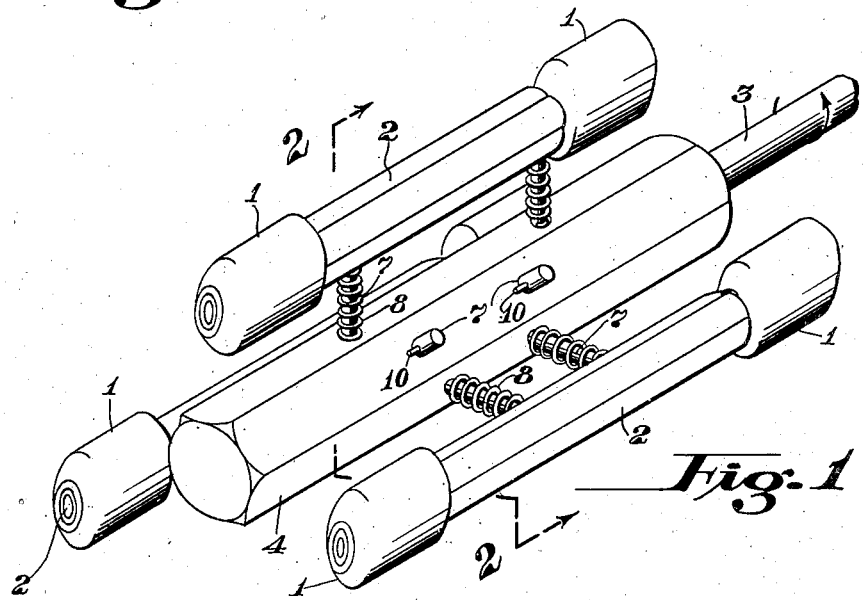
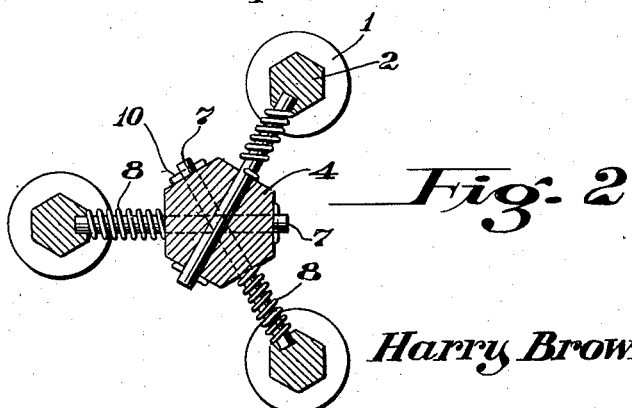
Harry Browning INVENTOR.
BY
Walter C. Wheeler
ATTORNEY Patented Feb. 26, 1946

2,395,450

UNITED STATES PATENT OFFICE 2,395,450

TOOL

Harry Browning, Louisville, Ky., assignor to E. I. du Pont de Nemours & Company, Wilmington, Del., a corporation of Delaware Application December 19, 1944, Serial No. 568,898

3 Claims. (Cl. 154—41)

This invention relates to devices suitable for use in making linings of plastic material for apparatus such as pipes and tanks.

In the lining of apparatus with plastic material, such as a lining of rubber, the walls of the apparatus are coated with a cement and sheets of unvulcanized rubber are applied to the walls. The sheet material is then rolled for eliminating air spaces and irregularities in the sheet and then the edges of the sheets are joined. Finally the apparatus is heated for vulcanizing the rubber. This method of applying the coating material has not been followed for lining cylindrical pipes of small sizes where space limitations do not permit the use of hand operated rollers. For lining the latter structures, the uncured lining material such as unvulcanized rubber in the form of a hollow cylinder is inserted in the pipe and then the lining is expanded into contact with the inner wall of the pipe by the action of compressed air during the vulcanization of the rubber. This procedure is not satisfactory in that the air pockets between the lining and the tube are not always eliminated, any air initially entrapped between the lining and the tube expands when heated and enlarges the pocket, any leakage of air through the tubular lining during vulcanization forms new air spaces or enlarges those already formed and the lining does not become as firmly bonded to the wall as a mechanically worked lining. It is therefore desirable to provide means applicable to tubular bodies of small diameter for mechanically working the lining material.

It is among the objects of the present invention to provide a device which is convenient for use in the preparation of plastic linings for tubular bodies. Another object of the invention is to avoid difficulties heretofore encountered in making such linings. The foregoing and other objects will be apparent from the following description in which the principle, embodiment and method of putting the invention into effect are set forth and illustrated with reference to the drawing in which Fig. 1 is a view in perspective of a device for use in lining pipes, Fig. 2 is a cross sectional view taken along the line 2—2 of Fig. 1, and Fig. 3 is a view partially in elevation and partially in cross section of a detail of the device shown in Fig. 1.

The objects of the invention are attained in general by providing a system of rollers which is supported upon and around a central shaft. The system is arranged to expand against the lining material for mechanically compressing and working it into contact with the cylinder to be lined.

Referring to Fig. 1, sets of contact rollers 1 are mounted to revolve at opposite ends of the auxiliary shafts 2. The rollers 1 are of somewhat greater diameter than the shafts and each is mounted to revolve around the axis of its supporting shaft. The auxiliary shafts 2 are disposed radially and parallel with respect to a main rotatable shaft 3 and are mounted at or near the end of the shaft 3. The mounting of the auxiliary shafts 2 is arranged so that the auxiliary shafts will travel in planes determined by the radii of the main shaft and so that the axes of the auxiliary shafts will be free to move to and from the axis of the main shaft in their several planes of action. Any number of auxiliary shafts and rollers may be provided as long as they are sufficient in number to carry the main shaft 3 as a floating shaft.

The main shaft 3 is preferably provided with an enlargement or head 4 upon which the auxiliary shafts 2 are mounted. The head 4 may be made integral with the shaft or it may be provided by screwing the thread end 5 of the shaft into the threaded end of the head. The head 4 is preferably but not necessarily provided with plane faces which are provided with bores 6 passing through the main axis and through which the supporting pins 7 are mounted to reciprocate.

The auxiliary shafts 2 are mounted integrally on the parallel supporting pins 7. This may be done by welding or brazing the ends of the pins 7 in suitable openings in the shafts 2 or as by threading and screwing the pins into threaded holes. Coil springs 8 are mounted on the pins 7 and biased between the auxiliary shafts 2 and the main shaft 3 for retaining the auxiliary shafts in outward positions with respect to the main shaft. The roller supports are mounted on the main shaft by inserting the pins 7 through the openings 6 and retaining them against the bias of springs 8 by the pins 10. At least two sets of pins 7 and springs 8 are provided for each auxiliary shaft so that the rollers at the ends of the shafts will be held in desired alignment with the axis of main shaft 3 but the pins for supporting one auxiliary shaft are staggered with respect to the pins of another auxiliary shaft so that the corresponding rollers 2 of the several shafts will lay in the same transverse planes and the pins will pass through the head 4 of the shaft independently of each other.

The rollers 1 may be secured at the ends of auxiliary shafts 2 by providing a countersunk opening in one end of the roller 1 which is large enough and deep enough to permit the nut 11 to be screwed down on the end of shaft 2 without interfering with the revolution of the roller 1.

In the operation of lining a cylindrical object such as a pipe with rubber, the inside surface of the pipe is first coated with a rubber cement or binder. A sheet of unvulcanized rubber cut so as to cover the inside of the pipe with considerable overlapping and curved generally into the form of a tube is then drawn into the pipe to be lined. The auxiliary shafts 2 of the working tool heretofore described are compressed against the springs 8 until the tool can be inserted into the tube and then they are released so that the rollers 1 bear against the unvulcanized rubber at the end of the pipe. The tool is then rotated and slowly advanced through the pipe, thereby mechanically working the entire surface of the lining material into a uniform layer of unvulcanized rubber integral with the pipe. The rubber is then cured by heating in the usual known manner.

The device may be revolved by a hand crank attached to the shaft 3 or the shaft 3 may be power driven. In making linings, different speeds of revolution will be found to be desirable for making different kinds of linings. For working a lining of unvulcanized rubber in a pipe 3 to 6 inches in diameter, a speed of rotation of about 60 revolutions per minute with a lineal rate of advance through the pipe of about 16 inches per minute is generally sufficient working to produce a satisfactory continuous integral coating of unvulcanized material of substantially uniform thickness, but these rates of rotation and advance may be varied to suit the characteristics of the lining to be installed.

If desired, the shaft 3 may be attached at its outer end to a device for advancing the rollers at a regular rate, such as a worm drive (not shown). It is desirable to provide power means for rotating and advancing the head and shaft of the tool through the tube when a large number of units are to be lined, but any means for rotating the head and advancing it linearly through the tube may be used. It is convenient to provide heads 4 carrying assemblies of different diameters and to attach them to the shaft 3 by a screw connection such as that shown in Fig. 3.

The rollers 1 are provided with cylindrical surfaces of more or less length depending upon the type of manipulation needed to work the lining material, and the rollers are rounded at least at their leading edges so that they will not gouge the lining material, especially before it is worked into contact with the inside surface of the pipe. A rounded edge of considerable radius is desirable at least on the leading edges of the rollers 1 so that all up-struck seams and roughness in the lining material will be gradually worked into a layer of smooth inner contour. The details of construction can be modified in numerous ways to suit the characteristics of material which is used for making the lining.

From the foregoing disclosure it will be recognized that the invention is susceptible of modification without departing from the spirit and scope thereof and it is to be understood that the invention is not restricted to the specific illustrations thereof herein set forth.

I claim:

1. In a device of the kind described a main rotatable shaft, a plurality of non-rotatable auxiliary shafts mounted on and around said main shaft with their axes parallel, pin members integral with said auxiliary shafts mounted in sliding engagement in radial openings through said main shaft, spring means biased between said main and auxiliary shafts and means to retain said pin members in said radial openings, and cylindrical rollers on the ends of said auxiliary shafts having their outer edges rounded.

2. A device in accordance with claim 1 in which the main shaft is provided with an enlarged head portion and the means for supporting the auxiliary shafts are carried by the enlarged head portion.

3. A device in accordance with claim 1 in which the main shaft is provided with an enlarged head having plain portions thereon parallel to the axis of the shaft, said radial openings through said main shaft being directed through said plain portions.

HARRY BROWNING.